(12) United States Patent
Sato (10) Patent No.: US 12,097,727 B2
(45) Date of Patent: Sep. 24, 2024

(54) PNEUMATIC TIRE

(71) Applicant: Toyo Tire Corporation, Itami (JP)

(72) Inventor: Yoshiki Sato, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/714,300

(22) Filed: Apr. 6, 2022

(65) Prior Publication Data

US 2022/0339971 A1    Oct. 27, 2022

(30) Foreign Application Priority Data

Apr. 23, 2021    (JP) ................................. 2021-073019

(51) Int. Cl.
  *B60C 13/00* (2006.01)
  *B60C 11/01* (2006.01)
  *B60C 13/02* (2006.01)

(52) U.S. Cl.
  CPC ............ *B60C 13/001* (2013.01); *B60C 11/01* (2013.01); *B60C 13/002* (2013.01); *B60C 13/02* (2013.01)

(58) Field of Classification Search
  CPC ..... B60C 13/01; B60C 13/001; B60C 13/002; B60C 13/00
  See application file for complete search history.

(56) References Cited

U.S. PATENT DOCUMENTS

| | | | |
|---|---|---|---|
| 6,189,586 B1 * | 2/2001 | Guidry | B60C 11/01 152/209.15 |
| 8,733,414 B2 | 5/2014 | Rittweger | |
| D761,193 S * | 7/2016 | Schimmoeller | D12/579 |
| D947,113 S * | 3/2022 | Umstot | D12/605 |
| D988,235 S * | 6/2023 | Geng | D12/544 |
| 2018/0086153 A1* | 3/2018 | Takita | B60C 11/01 |
| 2019/0255888 A1* | 8/2019 | Taniguchi | B60C 13/002 |
| 2020/0406688 A1* | 12/2020 | Iwamoto | B60C 13/02 |

FOREIGN PATENT DOCUMENTS

| | | | |
|---|---|---|---|
| CN | 107867121 A | 4/2018 | |
| CN | 110171249 A | 8/2019 | |
| WO | WO-2017071843 A1 * | 5/2017 | ............. B60C 11/01 |

OTHER PUBLICATIONS

WO 2017/071843 machine translation (Year: 2017).*
Office Action dated Mar. 26, 2024 issued in counterpart CN application No. 202210309810. (20 pages).

* cited by examiner

*Primary Examiner* — Justin R Fischer
*Assistant Examiner* — Wendy L Boss
(74) *Attorney, Agent, or Firm* — WHDA, LLP (57) ABSTRACT

A plurality of side blocks each has a high protruding portion, an amount by which the high protruding portion protrudes relative to a reference surface which is an exterior surface in a region peripheral to an insignia being not less than a maximum amount by which the insignia protrudes relative to the reference surface. The plurality of side blocks include a first side block which as viewed in the tire radial direction appears to overlap the insignia, and a second side block which as viewed in the tire radial direction appears not to overlap the insignia. An inner end in the tire radial direction of the high protruding portion of the first side block is separated in the tire radial direction from the insignia, and a portion of the high protruding portion of the second side block appears to overlap the insignia as viewed in the tire circumferential direction.

3 Claims, 11 Drawing Sheets

PNEUMATIC TIRE

CROSS REFERENCE TO RELATED APPLICATIONS

This application claims the benefit of priority of Japanese application no. 2021-73019, filed on Apr. 23, 2021, which is incorporated herein by reference.

BACKGROUND OF THE INVENTION

The present disclosure relates to a pneumatic tire.

There are situations in which the sidewall of a pneumatic tire might have a protective projection for protecting the tire, and an insignia that displays the product name, brand name, and/or the like. The insignia is a projection that protrudes toward the exterior in the tire axial direction from the profile surface (hereinafter sometimes also referred to as "reference surface") which is present in the region peripheral thereto. For example, a sidewall at the pneumatic tire of Patent Reference No. 1 has a protective projection in the form of a protective rib that extends continuously along the full circumference in the tire circumferential direction, and an insignia. At the specification of U.S. Pat. No. 8,733,414, a recess is formed at the inner end in the tire radial direction of a protective rib, a portion of the insignia being arranged within the recess, the insignia and the recess of the protective rib being mutually separated.

There is also a constitution in which, instead of the protective rib described at Patent Reference No. 1, the sidewall has a plurality of side blocks arranged at spaced intervals in the tire circumferential direction such that grooves are straddled therebetween. Where the constitution is such that there is a sidewall that has a plurality of side blocks, simultaneous achievement of insignia visibility and side block cut resistance is sought.

SUMMARY OF THE INVENTION

The present disclosure provides a pneumatic tire permitting simultaneous achievement of insignia visibility and side block cut resistance.

According of the present disclosure, there is provided a pneumatic tire having a sidewall that extends in a tire radial direction, wherein the sidewall has an insignia which protrudes toward an exterior in a tire axial direction, and a plurality of side blocks which protrude toward the exterior in the tire axial direction; the plurality of side blocks are respectively arranged at spaced intervals in a tire circumferential direction such that grooves extending in the tire radial direction are straddled therebetween; the insignia protrudes more toward the exterior in the tire axial direction than a reference surface which is an exterior surface in a region peripheral to the insignia; the plurality of side blocks each has a high protruding portion, an amount by which the high protruding portion protrudes relative to the reference surface being not less than a maximum amount by which the insignia protrudes relative to the reference surface; the plurality of side blocks include a first side block which as viewed in the tire radial direction appears to overlap the insignia, and a second side block which as viewed in the tire radial direction appears not to overlap the insignia; and an inner end in the tire radial direction of the high protruding portion of the first side block is separated in the tire radial direction from the insignia, and a portion of the high protruding portion of the second side block appears to overlap the insignia as viewed in the tire circumferential direction.

DETAILED DESCRIPTION OF THE PREFERRED EMBODIMENTS

First Embodiment

Below, a first embodiment in accordance with the present disclosure is described with reference to the drawings.

Figure 1:
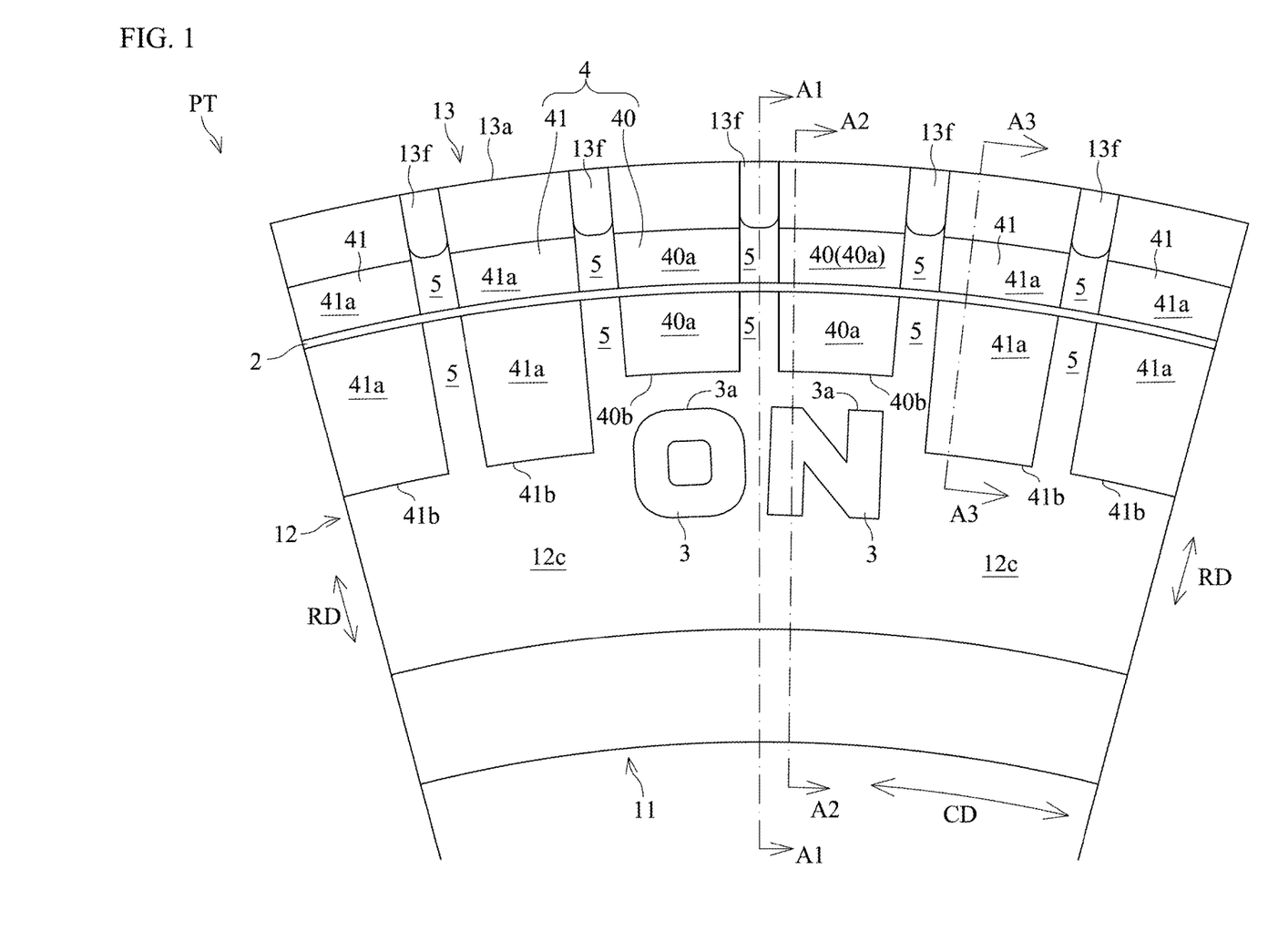
FIG. 1 Side view of a portion of a sidewall at a pneumatic tire in a first embodiment in accordance with the present disclosure as seen along a line of sight parallel to the tire axial direction.
Figure 2:
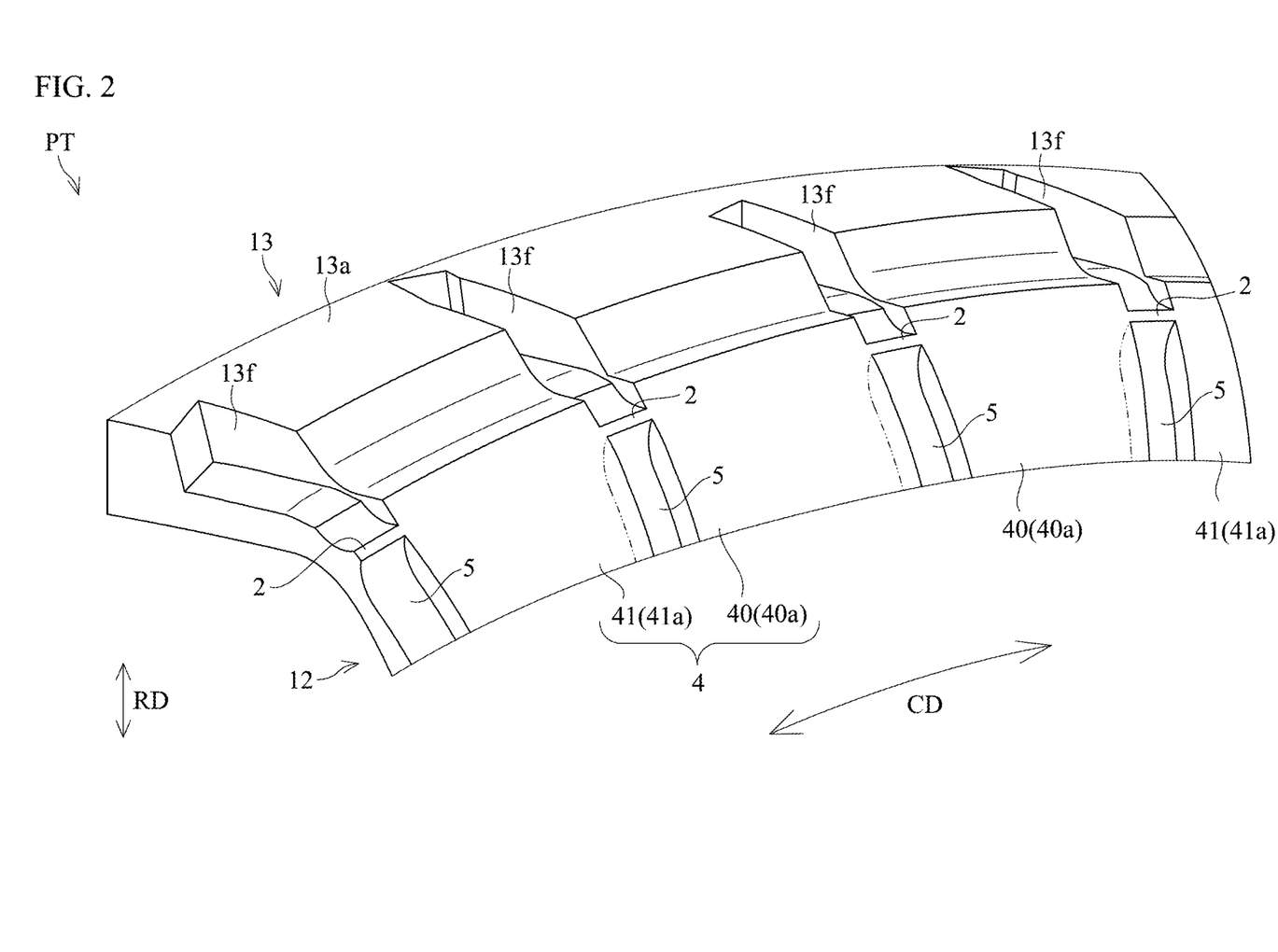
FIG. 2 Sectional perspective view showing a portion of the sidewall and tread of the first embodiment.
Figure 3:
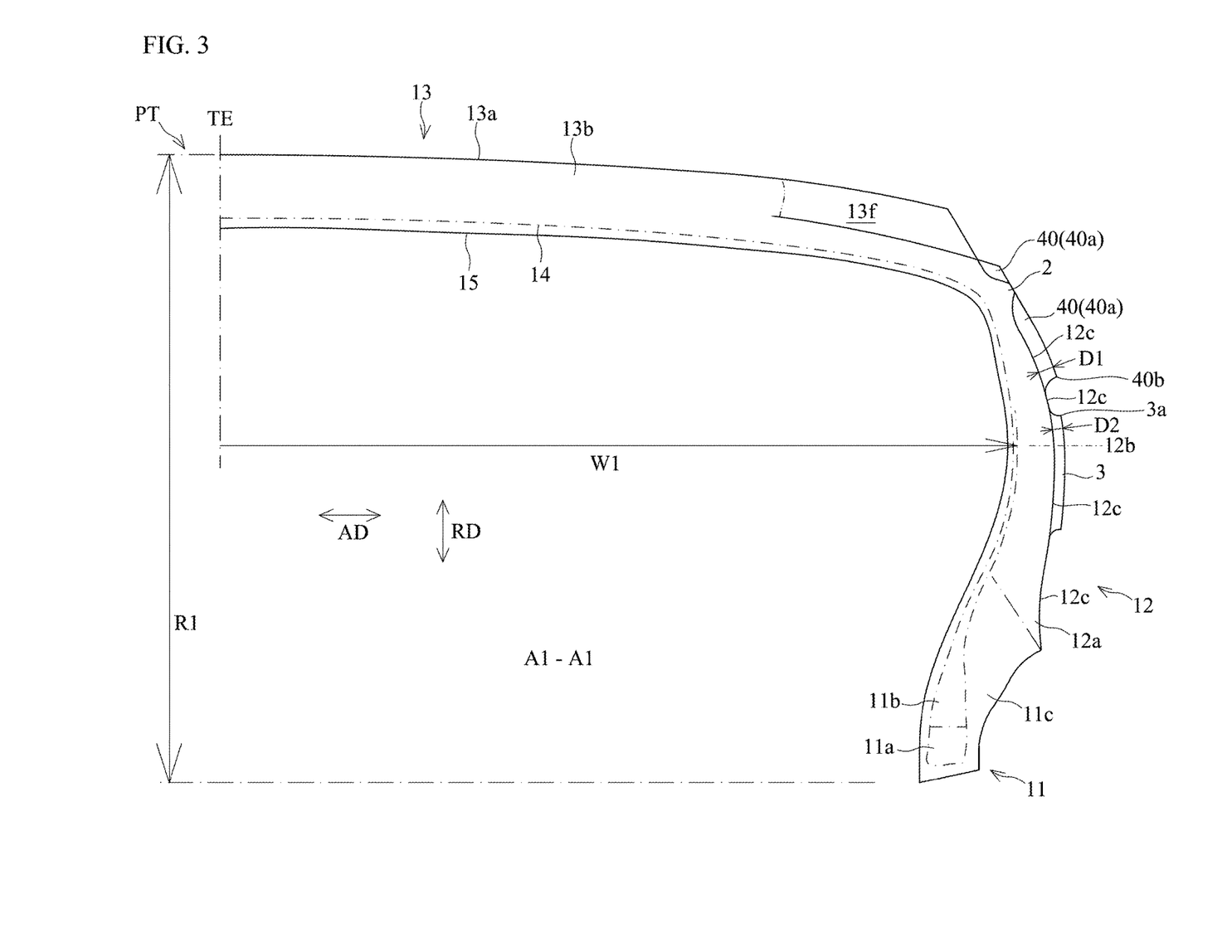
FIG. 3 Sectional view of section A1-A1 in FIG. 1.
Figure 4:
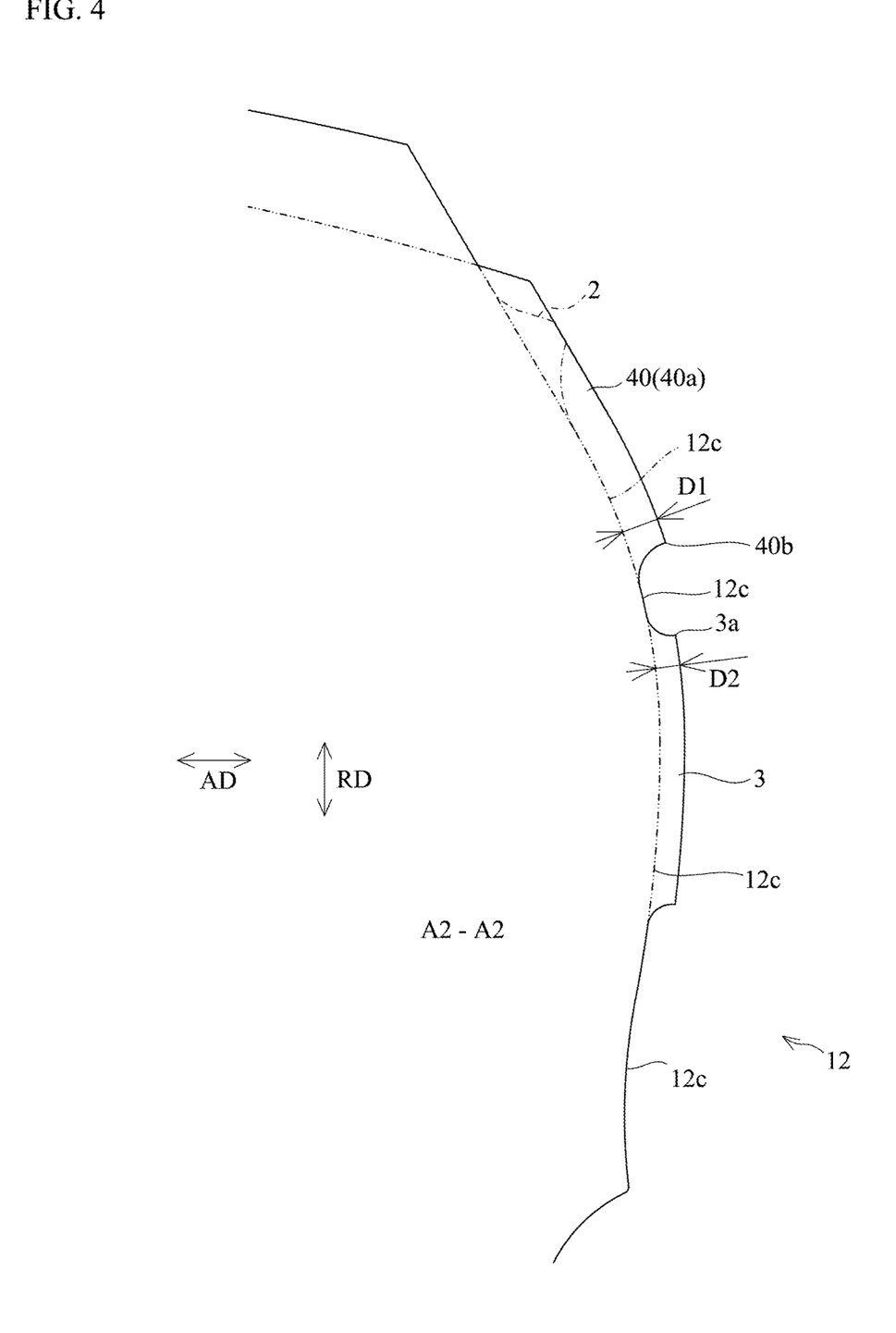
FIG. 4 Sectional view of section A2-A2 in FIG. 1.
Figure 5:
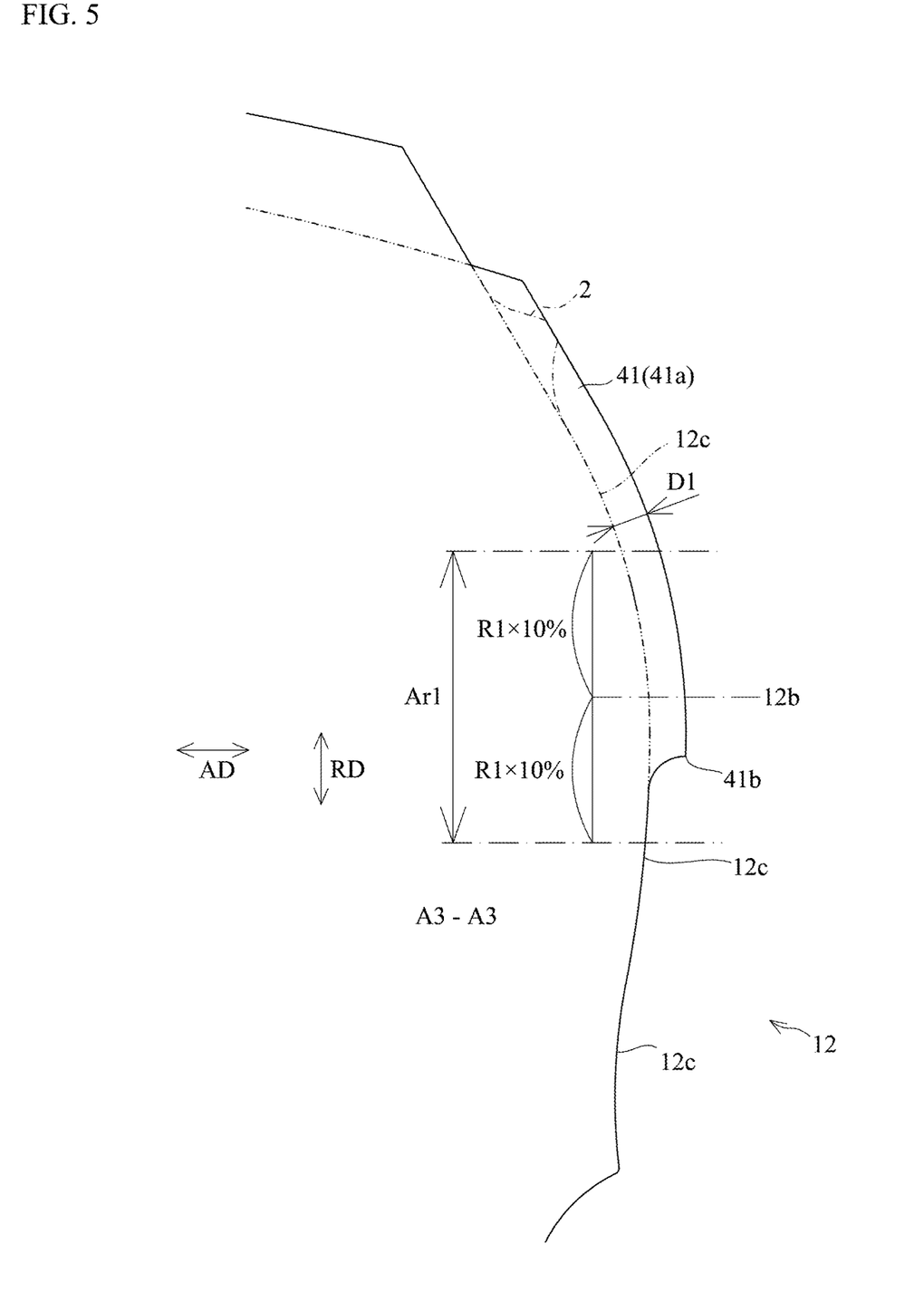
FIG. 5 Sectional view of section A3-A3 in FIG. 1.

FIG. 1 is a side view of a portion of a sidewall at pneumatic tire PT (hereinafter also referred to as simply "tire PT") in a first embodiment as seen along a line of sight parallel to the tire axial direction. FIG. 2 is a sectional perspective view showing a portion of the sidewall and tread of the first embodiment. FIG. 3 is a sectional view (tire meridional section) of section A1-A1 in FIG. 1. FIG. 4 is a sectional view (tire meridional section) of section A2-A2 in FIG. 1. FIG. 5 is a sectional view (tire meridional section) of section A3-A3 in FIG. 1. FIG. 3 shows only the region to one side in the tire axial direction AD from tire equatorial plane TE.

Basic Constitution

As shown in FIGS. 1 through 3, pneumatic tire PT has a pair of bead regions 11; sidewalls 12 which extend outwardly in the tire radial direction RD from the respective bead regions 11; and tread 13 which is connected to the respective outer ends in the tire radial direction RD of the pair of sidewalls 12 and which has tread surface 13a that comes in contact with the ground surface toward the exterior in the tire radial direction RD.

Tire equatorial plane TE refers to a plane that is located centrally in the tire axial direction AD and that is perpendicular to the rotational axis of the tire. Tire meridional planes refer to planes that are perpendicular to tire equatorial plane TE and that contain the rotational axis of the tire. In the tire axial direction AD, toward the interior means nearer to tire equatorial plane TE, and toward the exterior means farther away from tire equatorial plane TE. Furthermore, in the tire radial direction RD, toward the interior means nearer to the tire rotational axis, and toward the exterior means farther away from the tire rotational axis.

Bead region 11 has bead core 11a which is formed so as to be annular in shape, and bead filler 11b which is arranged toward the exterior in the tire radial direction RD from bead core 11a. Bead core 11a might, for example, be formed by laminating rubber-covered bead wire(s) (e.g., metal wire(s)). Bead filler 11b comprises hard rubber of higher rubber hardness than that of other rubber member(s) adjacent to bead filler 11b, and is formed such that the cross-sectional shape thereof tapers as one proceeds toward the exterior in the tire radial direction RD.

Furthermore, tire PT has carcass 14 suspended between pair of bead cores 11a, and innerliner 15 that is arranged toward the interior in the tire radial direction RD from carcass 14 and that faces the interior space of tire PT which is or will be filled with air. Carcass 14 and innerliner 15 are arranged in parallel fashion with respect to the inside circumferential surface of the tire over a portion thereof that encompasses bead regions 11, sidewalls 12, and tread 13.

Bead region 11 has rim strip rubber 11c arranged toward the exterior in the tire axial direction AD from carcass 14. Rim strip rubber 11c forms the outer surface that will come in contact with the rim. Sidewall 12 has sidewall rubber 12a arranged toward the exterior in the tire axial direction AD from carcass 14. Sidewall rubber 12a forms the outer surface.

Tread 13 has tread rubber 13b which forms tread surface 13a, and a belt (not shown) which is arranged between tread rubber 13b and carcass 14. The belt has a plurality (e.g., four) belt plies (not shown). The belt plies (not shown) have a plurality of belt cords (e.g., organic fiber and/or metal) which are arrayed in parallel fashion, and topping rubber with which the belt cords are covered.

Carcass 14 is made up of at least one carcass ply (not shown). The carcass ply (not shown) folds back upon itself and wraps about bead core 11a so as to envelop bead core 11a. Furthermore, the carcass ply (not shown) has a plurality of ply cords (e.g., organic fiber and/or metal) which are arrayed in direction(s) more or less perpendicular to the tire circumferential direction CD, and topping rubber with which the ply cords are covered. Note that while carcass 14 is shown in abbreviated fashion as a single-dash chain line in FIG. 3, in actuality it has some nonzero thickness.

Innerliner 15 has superior functionality in terms of its ability to impede passage of gas therethrough so as to permit air pressure to be maintained. Moreover, the constitution at sidewall 12 may be such that, as is the case in the first embodiment, there is no other member that intervenes between innerliner 15 and carcass 14.

Sidewalls 12 have locations 12b at the outer surfaces thereof which are at the same locations in the tire radial direction RD as the locations at which tire width is a maximum (more specifically, the locations at which distance W1 between respective exterior points in the tire axial direction AD of carcass 14 is a maximum). Below, these locations 12b are referred to as tire maximum width locations 12b.

While not shown in the drawings, tread rubber 13b has a plurality of main grooves (not shown) extending continuously in the tire circumferential direction CD along the entire length in the tire circumferential direction CD of tread surface 13a, and a plurality of ancillary grooves 13f, each of which extends to one of the outer ends in the tire axial direction AD.

Sidewall Structure

As shown in FIGS. 1 through 3, sidewall 12 has reference surface 12c, insignia 3 which protrudes toward the exterior in the tire axial direction AD from reference surface 12c, and a plurality of side blocks 4. Insignia 3 may be located at tire maximum width location 12b. Reference surface 12c is the outer surface that is present in the region peripheral to insignia 3. Reference surface 12c is present at least toward the interior in the tire radial direction RD from insignia 3, and is present to either side in the tire circumferential direction CD of insignia 3. In accordance with the first embodiment, reference surface 12c is present toward the interior and toward the exterior in the tire radial direction RD from insignia 3. Reference surface 12c is what is referred to as a "profile surface," inasmuch as it is arranged at locations that are rotationally symmetric about the tire rotational axis. Reference surface 12c is such that at least a portion thereof extends continuously along the full circumference in the tire circumferential direction CD. As viewed in a tire meridional section, reference surface 12c may be made up of a plurality of arcs of differing radii of curvature. Note that what is referred to as a protruding amount in the present specification is the amount of protrusion in a direction normal to reference surface 12c.

As shown in FIG. 1, as seen along a line of sight parallel to the tire axial direction AD, insignia 3 displays a plurality of characters, shapes, or symbols, or a combination thereof. Letters and numbers may be cited as examples of characters. Insignia 3 might display a brand name, product name, and/or company name. The dimension in the tire radial direction RD of insignia 3 may, as is the case in the first embodiment, be not less than 13 mm. This is because the visibility of insignia 3 would worsen if this were less than 13 mm. Where the dimension in the tire radial direction RD of insignia 3 is not less than 13 mm, it might be not greater than 30 mm, or it might be not greater than 30% of tire cross-sectional height R1.

Insignia 3 of the first embodiment is letters, the characters "O" and "N" being arranged so as to be spaced apart in the tire circumferential direction CD. Although insignia 3 protrudes by a constant amount in the first embodiment, there is no limitation with respect thereto. For example, insignia 3 might have a multilevel constitution in which each level protrudes by a different amount.

Sidewall 12 may, as is the case in the first embodiment, have annular projection 2 that extends in the tire circumferential direction CD and that protrudes in the tire axial direction AD. Annular projection 2 is arranged toward the exterior in the tire radial direction RD from insignia 3. Annular projection 2 and insignia 3 are mutually separated. Annular projection 2 may, as is the case in the first embodiment, extend continuously in the tire circumferential direction CD along the entire length in the tire circumferential direction CD of sidewall 12.

As shown in FIG. 1 and FIG. 2, the plurality of side blocks 4 are divided by grooves 5 that extend along the entire length in the tire radial direction RD except for annular projection 2. The plurality of side blocks 4 are respectively arranged at spaced intervals in the tire circumferential direction CD such that grooves 5 extending in the tire radial direction RD intervene therebetween. In accordance with the first embodiment, the plurality of side blocks 4 are arranged toward both the interior and the exterior in the tire radial direction RD from annular projection 2. The plurality of side blocks 4 include first side blocks 40 which as viewed in the tire radial direction RD appear to overlap insignia 3, and second side blocks 41 which as viewed in the tire radial direction RD appear not to overlap insignia 3. Depending on how insignia 3 is arranged, two first side blocks 40 might be adjacent in the tire circumferential direction CD, two second side blocks 41 might be adjacent in the tire circumferential direction CD, or one first side block 40 and one second side block 41 might be adjacent in the tire circumferential direction CD.

Note that insignia 3 is arranged so as to be not within groove 5 but so as to be located toward the interior in the tire radial direction RD from groove 5.

As shown in FIGS. 1 through 5, the plurality of side blocks 4 respectively have high protruding portions. First side block 40 has high protruding portion(s) 40a. Second side block 41 has high protruding portion(s) 41a. The amounts D1 by which high protruding portions 40a, 41a protrude relative to reference surface 12c are not less than the maximum amount D2 by which insignia 3 protrudes relative to reference surface 12c. Where this is the case, it will be true that D1≥D2. The amounts D1 by which high protruding portions 40a, 41a protrude relative to reference surface 12c may of course be greater than the maximum amount D2 by which insignia 3 protrudes relative to reference surface 12c. Where this is the case, it will be true that D1>D2. Note that reference surface 12c which is the reference relative to which the amounts D1 by which high protruding portions 40a, 41a are understood to protrude is both the profile surface and the groove bottom of groove 5. The amount by which insignia 3 protrudes relative to reference surface 12c might be not less than 0.4 mm but not greater than 4 mm.

As described above, side blocks 4 permit achievement of cut resistance. It is desirable that cut resistance be improved. It is desirable that insignia 3 have good visibility. But where sidewall 12 is of narrow width, there will be a tradeoff between side blocks 4 and insignia 3. If, for example, the size in the tire radial direction RD of side block(s) 4 is decreased, because the space available in the tire radial direction RD for insignia 3 will increase, this will permit improvement in the visibility of insignia 3 but will have the negative consequence of decreasing cut resistance. On the other hand, if the size in the tire radial direction RD of insignia 3 is decreased, because the space available in the tire radial direction RD for side block(s) 4 will increase, this will permit improvement in cut resistance but will have the negative consequence of decreasing the visibility of insignia 3. This problem is particularly pronounced with low-profile tires.

As shown in FIG. 1, FIG. 3, and FIG. 4, to permit simultaneous achievement of visibility of insignia 3 as well as cut resistance, inner end 40b in the tire radial direction RD of high protruding portion 40a at first side block 40 is separated in the tire radial direction RD from insignia 3. As a result, by causing high protruding portion 40a which can impede the visibility of insignia 3 to be separated in the tire radial direction RD from insignia 3, it is possible to suppress worsening of visibility that would otherwise occur. Furthermore, inner end 40b in the tire radial direction RD of high protruding portion 40a at first side block 40 is located toward the interior in the tire radial direction RD from annular projection 2. This makes it possible to further ensure cut resistance. Moreover, as viewed in the tire circumferential direction CD, a portion of high protruding portion 41a at second side block 41 appears to overlap insignia 3. That is, inner end 41b in the tire radial direction RD of high protruding portion 41a at second side block 41 is arranged toward the interior in the tire radial direction RD from outer end 3a in the tire radial direction RD of insignia 3. As a result, because it will be possible to increase the size in the tire radial direction RD of second side block 41, this makes it possible to improve cut resistance.

As shown in FIG. 5, inner end 41b in the tire radial direction RD of high protruding portion 41a at second side block 41 may be located within a zone (Ar1) centered on tire maximum width location 12b and bounded by a distance which is 10% of tire cross-sectional height R1 in the tire radial direction RD therefrom. As shown in FIG. 3, tire cross-sectional height R1 is the length in the tire radial direction RD from the outwardmost outer end in the tire radial direction RD of tread 13 to the inner end in the tire radial direction RD of bead region 11.

As shown in FIG. 5, if inner end 41b in the tire radial direction RD of high protruding portion 41a at second side block 41 is located toward the exterior in the tire radial direction RD from this zone Ar1, it will be difficult to obtain cut resistance with protective effect from second side block 41. Furthermore, if inner end 41b is located toward the interior in the tire radial direction RD from this zone Ar1, while it will be possible to obtain cut resistance from second side block 41, because the region toward the interior in the tire radial direction RD from zone Ar1 will tend not to make contact with the ground, this means that second side block 41 would be arranged at an unneeded region, which would cause increase in weight. By therefore causing it to be within this zone Ar1, appropriate simultaneous achievement of cut resistance and suppression of increase in weight will be possible.

Second Embodiment

Figure 6:
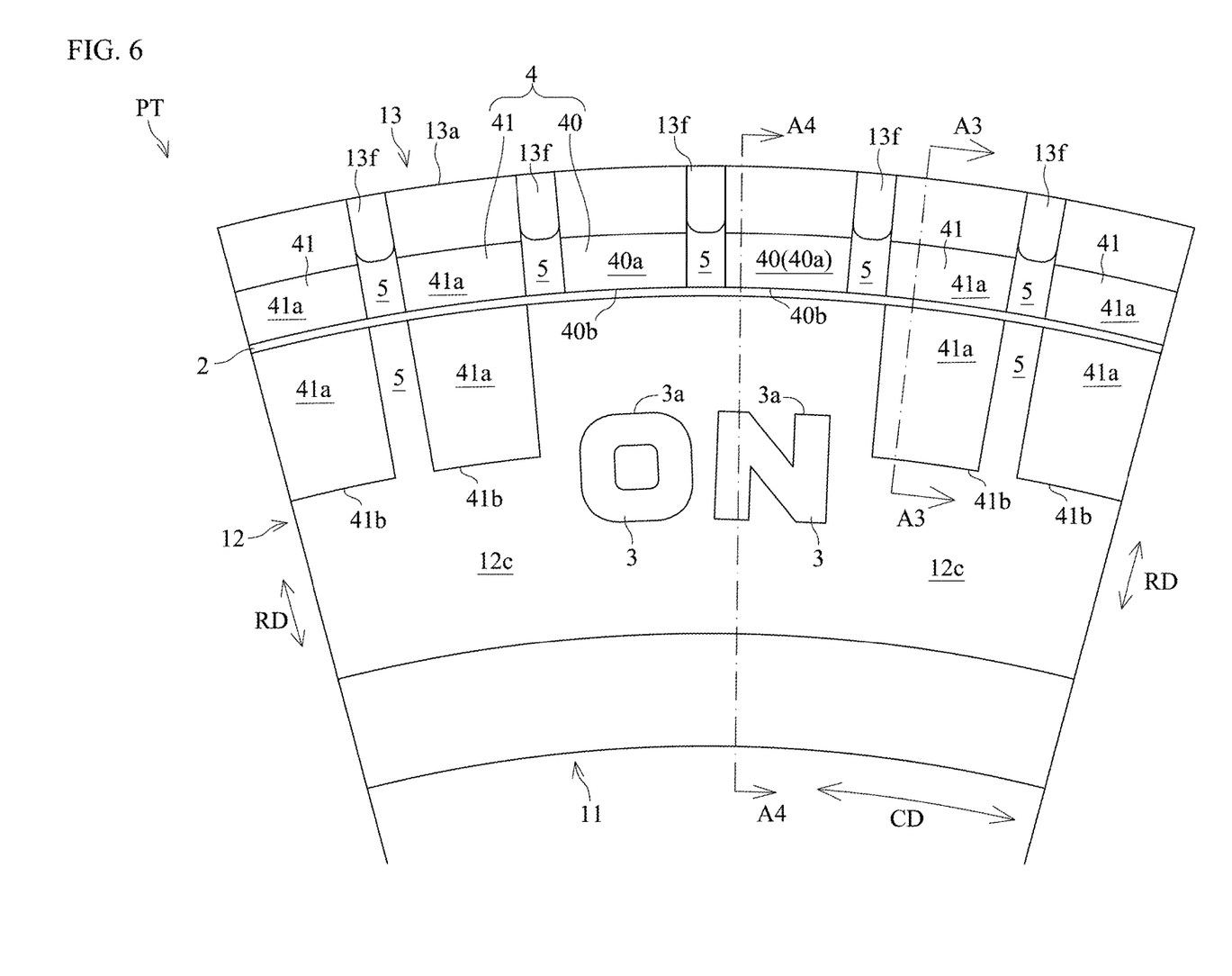
FIG. 6 Side view of a portion of the sidewall at tire PT in a second embodiment as seen along a line of sight parallel to the tire axial direction.
Figure 7:
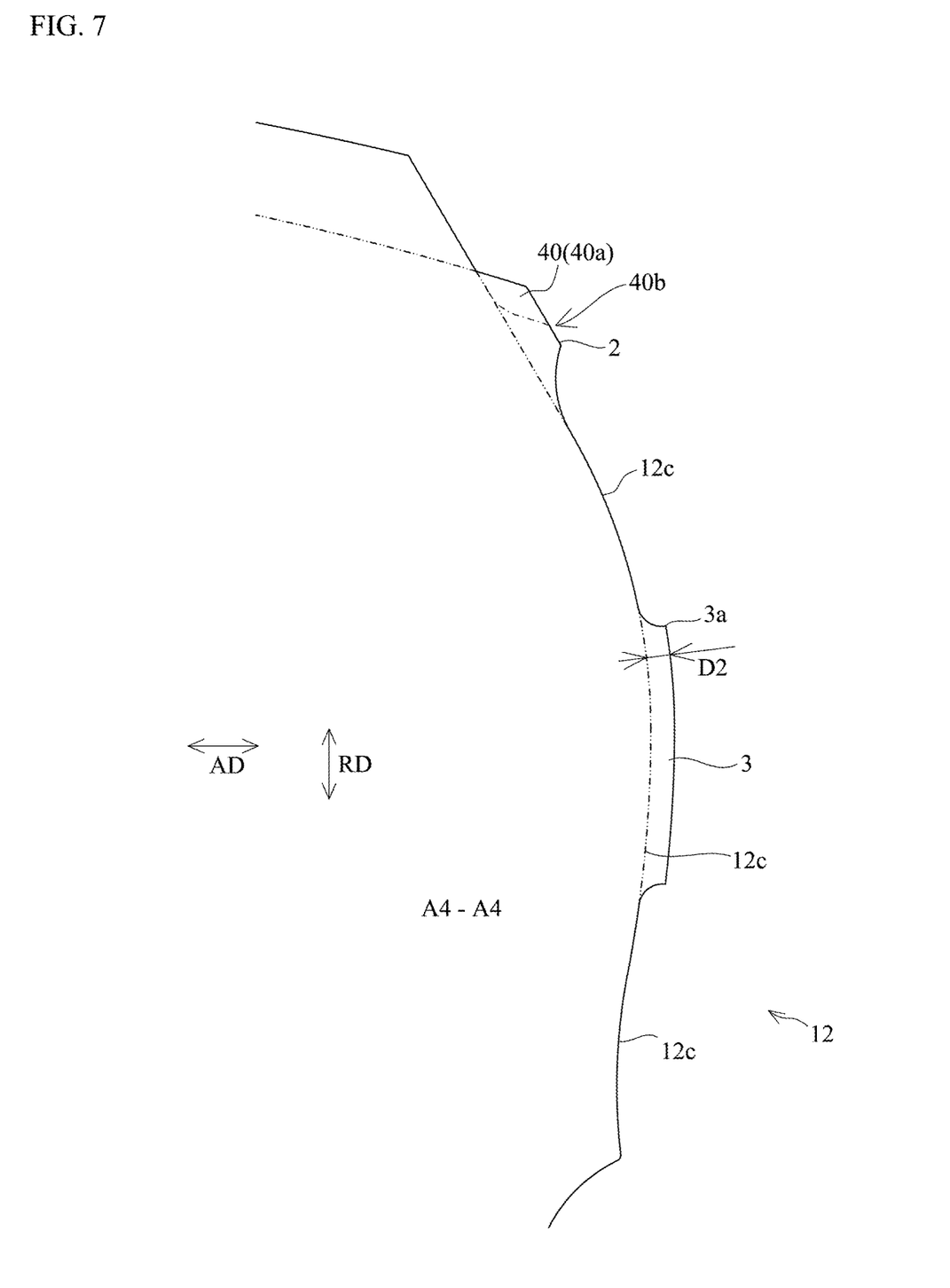
FIG. 7 Sectional view of section A4-A4 in FIG. 6.

A second embodiment will next be described. FIG. 6 is a side view of a portion of the sidewall at tire PT in a second embodiment as seen along a line of sight parallel to the tire axial direction. FIG. 7 is a sectional view (tire meridional section) of section A4-A4 in FIG. 6. The sectional view of section A3-A3 in FIG. 6 is the same as at FIG. 5. As shown in FIG. 6 and FIG. 7, the dimension in the tire radial direction RD of first side block 40 at the second embodiment is shorter than was the case at the first embodiment. As shown in FIG. 6 and FIG. 7, high protruding portion 40a at first side block 40 of the second embodiment is not arranged toward the interior in the tire radial direction RD from annular projection 2 but is arranged only toward the exterior in the tire radial direction RD from annular projection 2. Inner end 40b in the tire radial direction RD of high protruding portion 40a at first side block 40 terminates at annular projection 2. As a result, because the distance in the tire radial direction RD separating first side block 40 and insignia 3 is greater than was the case at the first embodiment, this makes it possible to improve the visibility of insignia 3. The amount by which high protruding portion 40a of first side block 40 protrudes is the same as the amount D1 by which high protruding portion 40a of first side block 40 at the first embodiment protrudes.

In other respects, it is similar to the first embodiment.

Third Embodiment

Figure 8:
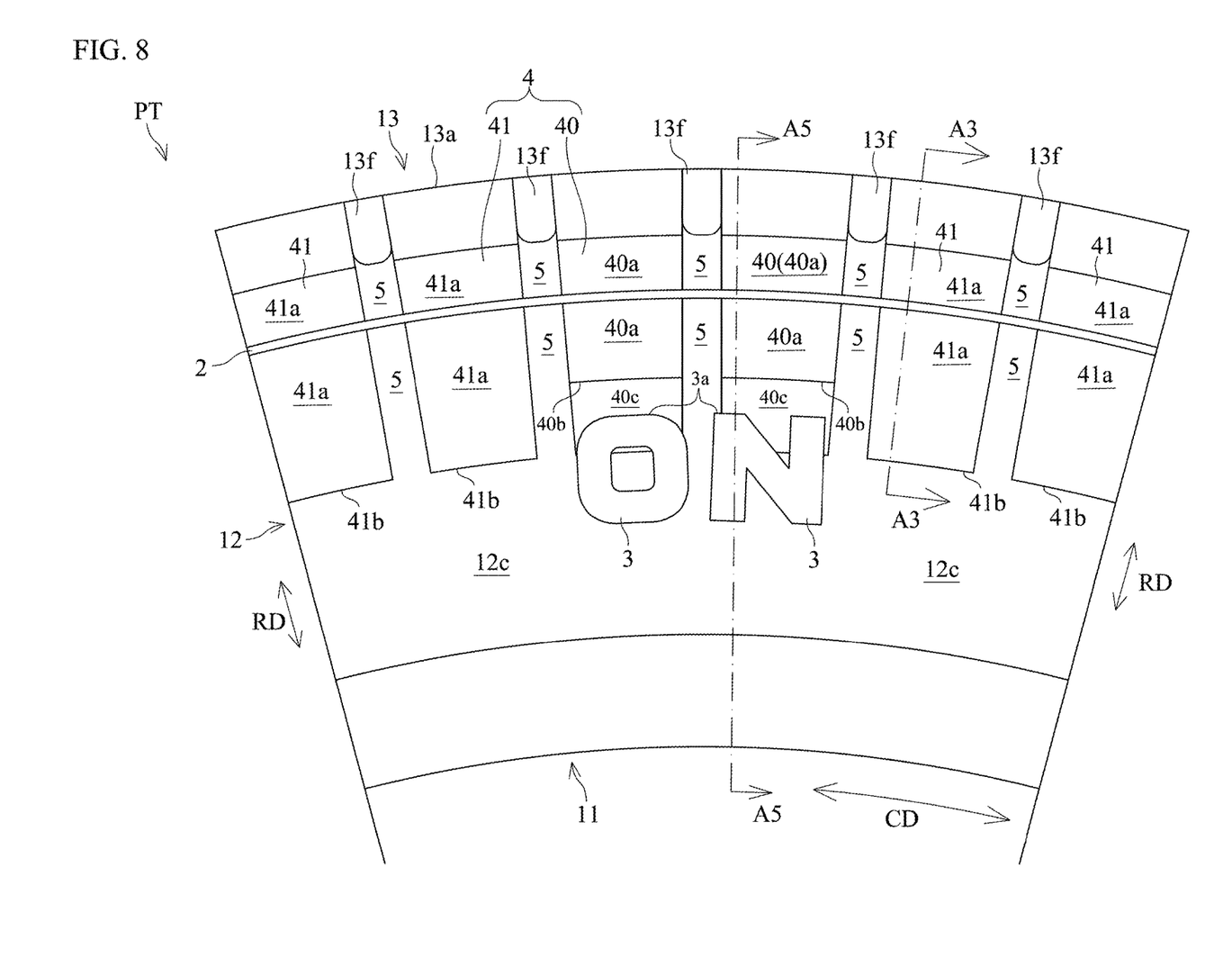
FIG. 8 Side view of a portion of the sidewall at tire PT in a third embodiment as seen along a line of sight parallel to the tire axial direction.
Figure 9:
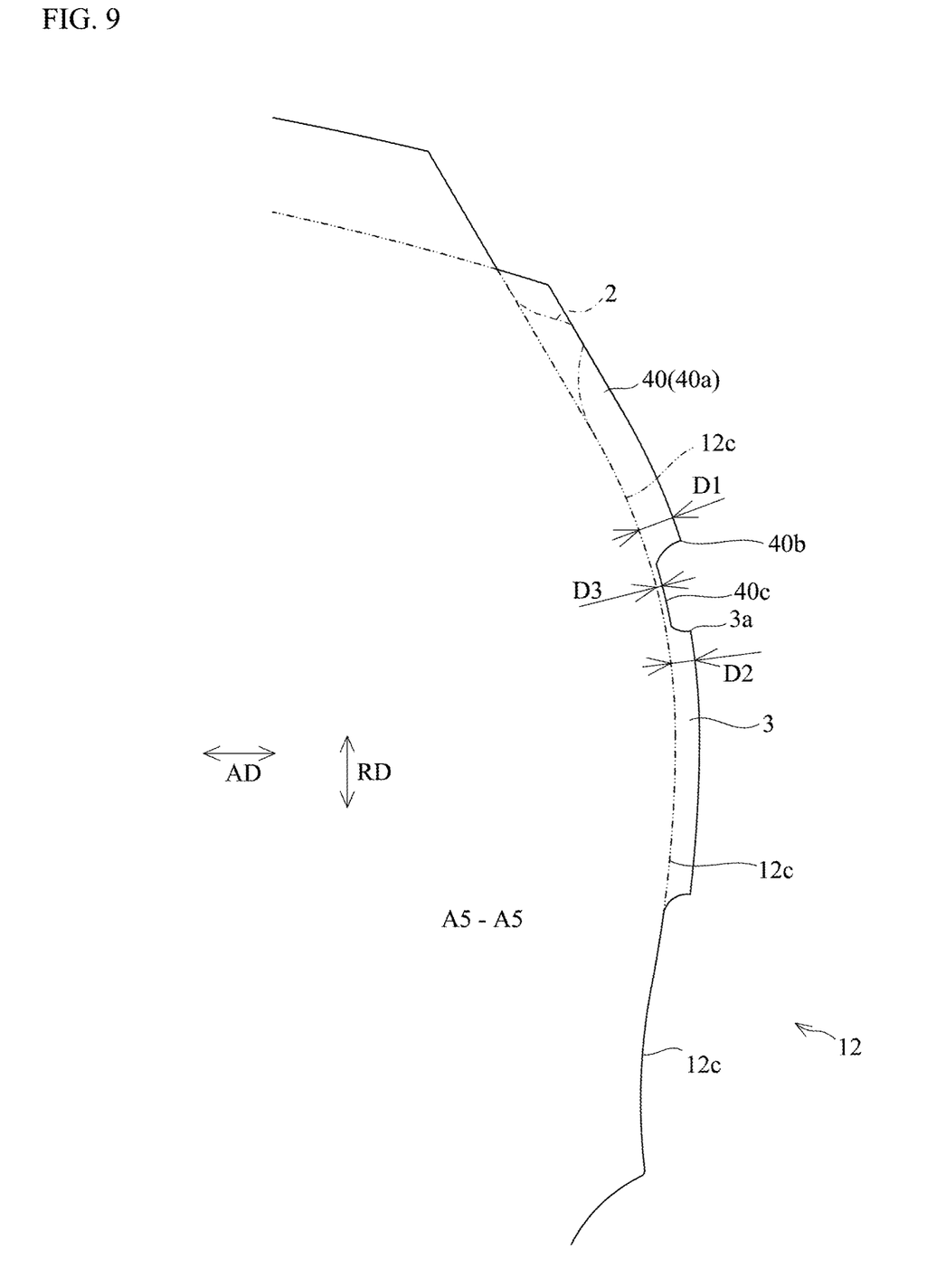
FIG. 9 Sectional view of section A5-A5 in FIG. 8.

A third embodiment will next be described. FIG. 8 is a side view of a portion of the sidewall at tire PT in a third embodiment as seen along a line of sight parallel to the tire axial direction. FIG. 9 is a sectional view (tire meridional section) of section A5-A5 in FIG. 8. The sectional view of section A3-A3 in FIG. 8 is the same as at FIG. 5. As shown in FIG. 8 and FIG. 9, first side block 40 has low protruding portion 40c. The amount D3 by which low protruding portion 40c of first side block 40 protrudes relative to reference surface 12c is less than the maximum amount D2 by which insignia 3 protrudes relative to reference surface 12c. Where this is the case, it will be true that D1≥D2>D3.

Low protruding portion 40c of first side block 40 extends toward the interior in the tire radial direction RD from high protruding portion 40a of first side block 40 and is connected to insignia 3. Whereas the amount by which low protruding portion 40c protrudes is constant in the third embodiment, it need not be constant.

As a result, because high protruding portion 40a of first side block 40 is separated from insignia 3, and because high protruding portion 40a is moreover not present in the region peripheral to insignia 3, this makes it possible to suppress worsening of the visibility of insignia 3 due to high protruding portion 40a. Furthermore, by causing low protruding portion 40c to be connected to insignia 3, it will be possible to ensure achievement of the protective function and visual attractiveness provided by high protruding portion 40a and low protruding portion 40c at first side block 40. It is preferred that the shape of low protruding portion 40c as seen along a line of sight parallel to the tire axial direction AD be the same as the shape of second side block 41. This will make it possible to obtain a consistent visually attractive appearance.

Fourth Embodiment

Figure 10:
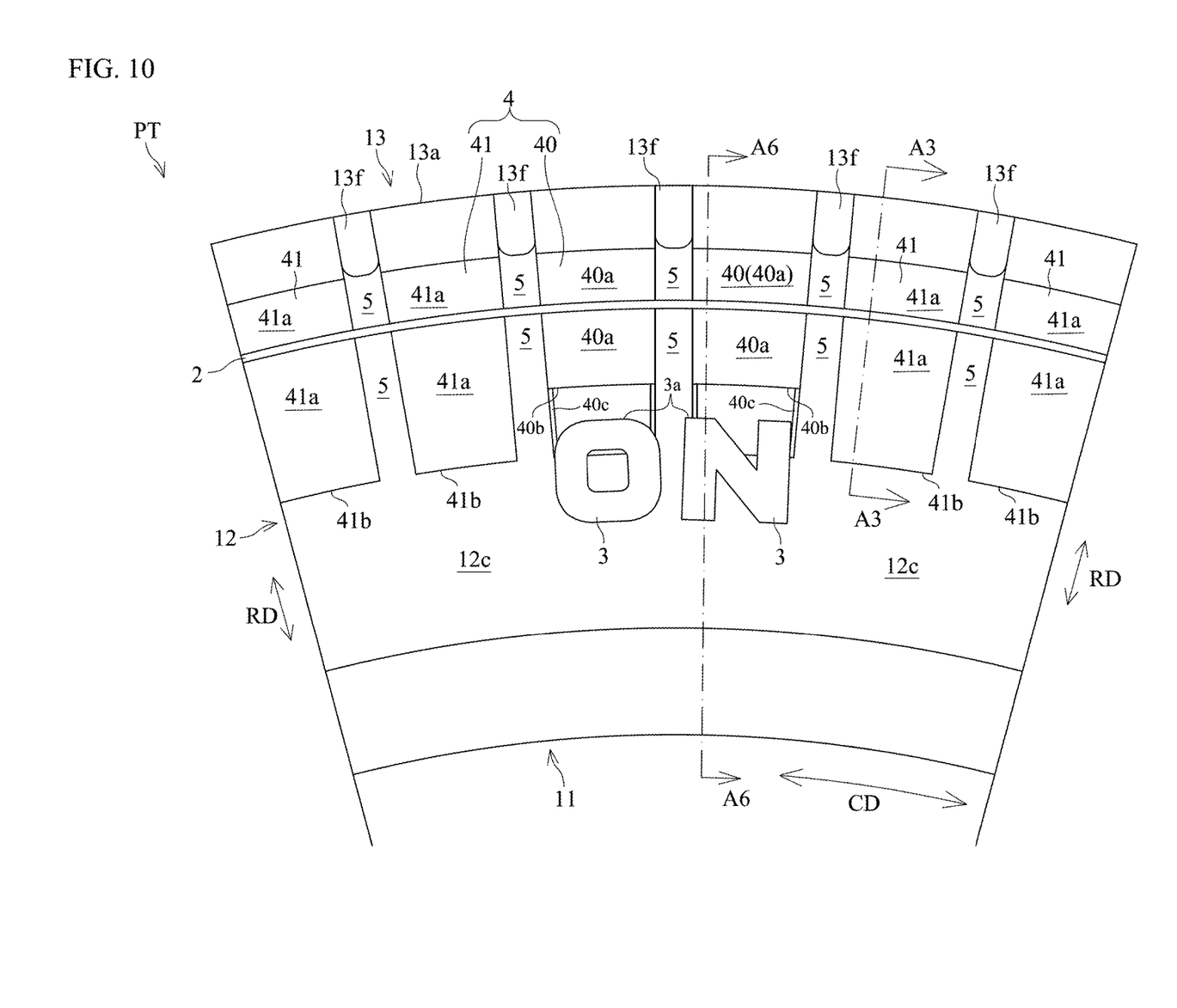
FIG. 10 Side view of a portion of the sidewall at tire PT in a fourth embodiment as seen along a line of sight parallel to the tire axial direction.
Figure 11:
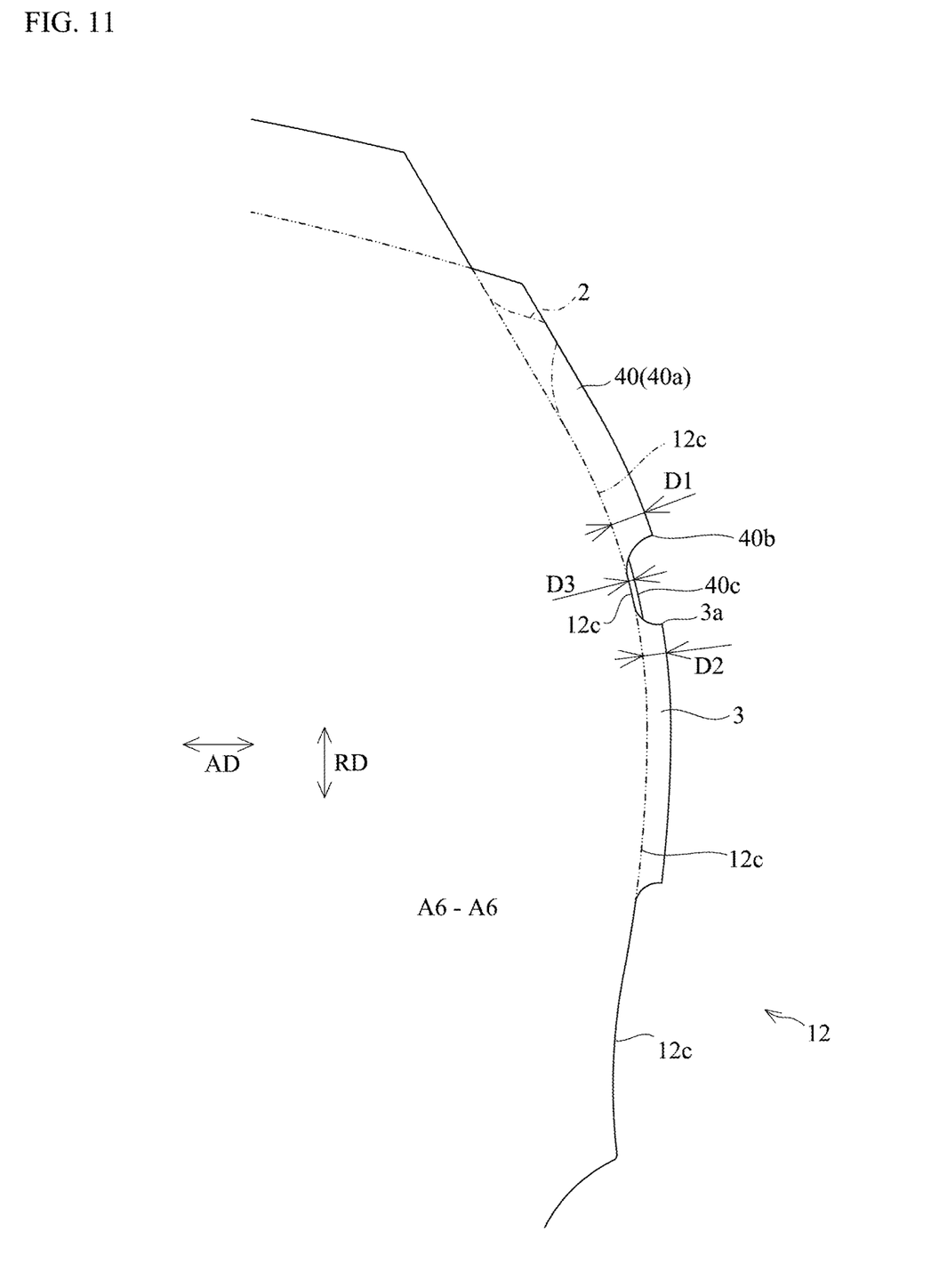
FIG. 11 Sectional view of section A6-A6 in FIG. 10.

A fourth embodiment will next be described. FIG. 10 is a side view of a portion of the sidewall at tire PT in a fourth embodiment as seen along a line of sight parallel to the tire axial direction. FIG. 11 is a sectional view (tire meridional section) of section A6-A6 in FIG. 10. The sectional view of section A3-A3 in FIG. 10 is the same as at FIG. 5. As shown in FIG. 10 and FIG. 11, low protruding portion 40c protrudes from reference surface 12c and has an outline in the shape of a closed loop as viewed in the tire axial direction AD. The amount by which the region enclosed by the closed loop of the outline protrudes relative to reference surface 12c is less than the amount D3 by which the outline itself protrudes therefrom. Whereas the amount by which the region enclosed by the closed loop of the outline protrudes relative to reference surface 12c is 0 mm in the fourth embodiment, this may be not less than 0 mm but less than D3. Cross-sectional shape in a direction perpendicular to the direction in which the outline extends might be convex after the fashion of a triangle comprising two straight lines, or it might be convex with rounded tip, or it might be trapezoidal such that there is a flat surface at the tip.

As a result of adoption such constitution, it will be possible as was the case at the third embodiment to ensure achievement of the protective function and visual attractiveness provided by first side block 40 without impeding the visibility of insignia 3.

Note that the foregoing respective dimensions, positional relationships, and relative magnitudes should be understood to be as measured under normal conditions when tire PT mounted on a normal rim and inflated to normal internal pressure is under no load. A normal rim is that particular rim which is specified for use with a particular tire in the context of the body of standards that contains the standard that applies to the tire in question. This is referred to as a "standard rim" in the case of JATMA, and as a "measuring rim" in the case of TRA or ETRTO.

Normal internal pressure is that air pressure which is specified for use with a particular tire in the context of the body of standards that contains the standard that applies to the tire in question. This is referred to as "maximum air pressure" in the case of JATMA, the maximum value listed in the table entitled "Tire Load Limits at Various Cold Inflation Pressures" in the case of TRA, and as "inflation pressure" in the case of ETRTO.

Variations (1) Whereas the plurality of side blocks 4 may be arranged toward both the interior and the exterior in the tire radial direction RD from annular projection 2 as is the case at the first embodiment, there is no limitation with respect thereto. For example, these may be arranged only toward the exterior in the tire radial direction RD from annular projection 2 as is the case at the second embodiment. Furthermore, these may be arranged only toward the interior in the tire radial direction RD from annular projection 2.

(2) Whereas annular projection 2 is provided at the first through fourth embodiments, annular projection 2 need not be present. Where annular projection 2 is not present, the plurality of side blocks may be divided by grooves 5 that extend along the entire length in the tire radial direction.

(3) Whereas at the first through fourth embodiments the amount by which annular projection 2 protruded and the amount by which side block 4 protruded was the same, these being coplanar, there is no limitation with respect thereto. For example, the amount by which annular projection 2 protrudes may be greater than the amount by which side block 4 protrudes.

(4) A constitution may be adopted which combines the second embodiment with the third and fourth embodiments. That is, first side block 40 may have high protruding portion 40a and low protruding portion 40c; inner end 40b in the tire radial direction RD of high protruding portion 40a at first side block 40 may terminate at annular projection 2; and/or low protruding portion 40c of first side block 40 may extend so as to be directed toward the interior in the tire radial direction RD from high protruding portion 40a (annular projection 2) and may be connected to insignia 3.

As described above, as in the first to fourth embodiment, the pneumatic tire may have a sidewall 12 that extends in a tire radial direction RD, wherein the sidewall 12 may have an insignia 3 which protrudes toward an exterior in a tire axial direction AD, and a plurality of side blocks 4 which protrude toward the exterior in the tire axial direction AD; the plurality of side blocks 4 are respectively arranged at spaced intervals in a tire circumferential direction such that grooves 5 extending in the tire radial direction RD are straddled therebetween; the insignia 3 protrudes more toward the exterior in the tire axial direction AD than a reference surface 12c which is an exterior surface in a region peripheral to the insignia 3; the plurality of side blocks 4 each has a high protruding portion 40a, 41a, an amount D1 by which the high protruding portion 40a, 41a protrudes relative to the reference surface 12c being not less than a maximum amount D2 by which the insignia 3 protrudes relative to the reference surface 12c; the plurality of side blocks 4 include a first side block 40 which as viewed in the tire radial direction appears to overlap the insignia 3, and a second side block 41 which as viewed in the tire radial direction appears not to overlap the insignia 3; and an inner end 40b in the tire radial direction RD of the high protruding portion 40a of the first side block 40 is separated in the tire radial direction from the insignia 3, and a portion of the high protruding portion 41a of the second side block 41 appears to overlap the insignia 3 as viewed in the tire circumferential direction.

Thus, because inner end 40b in the tire radial direction RD of high protruding portion 40a at first side block 40 which will appear to overlap insignia 3 as viewed in the tire radial direction RD will be separated in the tire radial direction RD from insignia 3, it will be possible to ensure the visibility of insignia 3. Moreover, because a portion of high protruding portion 41a of second side block 41 which appears not to overlap insignia 3 as viewed in the tire radial direction RD will appear to overlap insignia 3 as viewed in the tire circumferential direction CD, it will be possible to ensure cut resistance.

Accordingly, it will be possible to simultaneously achieve visibility of insignia 3 and cut resistance.

As in the first, third and fourth embodiment, the sidewall 12 may have an annular projection 2 that extends continuously along a full circumference in the tire circumferential direction CD; and the inner end 40b in the tire radial direction RD of the high protruding portion 40a of the first side block 40 may be located toward an interior in the tire radial direction RD from the annular projection 2.

As a result of adoption of such constitution, it will be possible to ensure visibility of insignia 3 which will be relatively large.

As in the second embodiment, the sidewall 12 may have an annular projection 2 that extends continuously along a full circumference in the tire circumferential direction CD; and the inner end 40b in the tire radial direction RD of the high protruding portion 40a of the first side block 40 terminates at the annular projection 2.

As a result of adoption of such constitution, it will be possible to simultaneously achieve visibility of insignia 3 and protective effect due to side blocks 4.

As in the third and fourth embodiment, the first side block 40 may have a low protruding portion 40c, an amount D3 by which the low protruding portion 40c protrudes relative to the reference surface 12c being less than the maximum amount D2 by which the insignia 3 protrudes relative to the reference surface 12c; and the low protruding portion 40c extends toward an interior in the tire radial direction RD from the high protruding portion 40a of the first side block 40 and is connected to the insignia 3.

As a result of adoption of such constitution, it will be possible to simultaneously achieve the protective function provided by side blocks 4 and visibility of insignia 3.

As in the fourth embodiment, the low protruding portion 40c may protrude from the reference surface 12c and may have an outline in a shape of a closed loop as viewed in the tire axial direction AD, an amount by which a region enclosed by closed loop of the outline protrudes relative to the reference surface 12c being less than an amount D3 by which the outline protrudes relative to the reference surface 12c.

As a result of adoption of such constitution, it will be possible to ensure achievement of the protective function and visual attractiveness provided by side blocks 4 without impeding the visibility of insignia 3.

As in the first to fourth embodiment, an inner end 41b in the tire radial direction RD of the high protruding portion 41a of the second side block 41 may be located within a zone (Ar1) centered on a tire maximum width location 12b and bounded by a distance which is 10% of a tire cross-sectional height R1 in the tire radial direction therefrom.

As a result of adoption of such constitution, it will be possible to suppress increase in weight and ensure achievement of cut resistance by means of second side blocks 41.

As in the first to fourth embodiment, a dimension in the tire radial direction of the insignia may be not less than 13 mm.

As a result of adoption of such constitution, it will be possible to ensure visibility of insignia 3.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment (s) may be employed as desired at any other embodiment(s). The specific constitution of the various components is not limited only to the foregoing embodiment(s) but admits of any number of variations without departing from the gist of the present disclosure.

The invention claimed is:

1. A pneumatic tire comprising a sidewall that extends in a tire radial direction, wherein
   the sidewall has an insignia which protrudes toward an exterior in a tire axial direction, and a plurality of side blocks which protrude toward the exterior in the tire axial direction;
   the plurality of side blocks are respectively arranged at spaced intervals in a tire circumferential direction such that grooves extending in the tire radial direction are straddled therebetween;
   the insignia protrudes more toward the exterior in the tire axial direction than a reference surface which is an exterior surface in a region peripheral to the insignia;
   the plurality of side blocks each has a high protruding portion, an amount by which the high protruding portion protrudes relative to the reference surface being not less than a maximum amount by which the insignia protrudes relative to the reference surface;
   the plurality of side blocks include a first side block which as viewed in the tire radial direction appears to overlap the insignia, and a second side block which as viewed in the tire radial direction appears not to overlap the insignia;
   an inner end in the tire radial direction of the high protruding portion of the first side block is separated in the tire radial direction from the insignia, and a portion of the high protruding portion of the second side block appears to overlap the insignia as viewed in the tire circumferential direction, wherein,
   the sidewall has an annular projection that extends continuously along a full circumference in the tire circumferential direction;
   the inner end in the tire radial direction of the high protruding portion of the first side block is located toward an interior in the tire radial direction from the annular projection; and
   an innermost end in tire radial direction of the high protruding portion of first side block is located outside of an outermost end of the insignia in the tire radial direction,
   wherein the plurality of side blocks are arranged toward both the interior and the exterior in the tire radial direction from the annular projection.

2. A pneumatic tire comprising a sidewall that extends in a tire radial direction, wherein
   the sidewall has an insignia which protrudes toward an exterior in a tire axial direction, and a plurality of side blocks which protrude toward the exterior in the tire axial direction;
   the plurality of side blocks are respectively arranged at spaced intervals in a tire circumferential direction such that grooves extending in the tire radial direction are straddled therebetween;

the insignia protrudes more toward the exterior in the tire axial direction than a reference surface which is an exterior surface in a region peripheral to the insignia;

the plurality of side blocks each has a high protruding portion, an amount by which the high protruding portion protrudes relative to the reference surface being not less than a maximum amount by which the insignia protrudes relative to the reference surface;

the plurality of side blocks include a first side block which as viewed in the tire radial direction appears to overlap the insignia, and a second side block which as viewed in the tire radial direction appears not to overlap the insignia;

an inner end in the tire radial direction of the high protruding portion of the first side block is separated in the tire radial direction from the insignia, and a portion of the high protruding portion of the second side block appears to overlap the insignia as viewed in the tire circumferential direction, wherein, the sidewall has an annular projection that extends continuously along a full circumference in the tire circumferential direction;

the inner end in the tire radial direction of the high protruding portion of the first side block terminates at the annular projection; and an innermost end in tire radial direction of the high protruding portion of first side block is located outside of an outermost end of the insignia in the tire radial direction.

3. A pneumatic tire comprising a sidewall that extends in a tire radial direction, wherein the sidewall has an insignia which protrudes toward an exterior in a tire axial direction, and a plurality of side blocks which protrude toward the exterior in the tire axial direction;

the plurality of side blocks are respectively arranged at spaced intervals in a tire circumferential direction such that grooves extending in the tire radial direction are straddled therebetween;

the insignia protrudes more toward the exterior in the tire axial direction than a reference surface which is an exterior surface in a region peripheral to the insignia;

the plurality of side blocks each has a high protruding portion, an amount by which the high protruding portion protrudes relative to the reference surface being not less than a maximum amount by which the insignia protrudes relative to the reference surface;

the plurality of side blocks include a first side block which as viewed in the tire radial direction appears to overlap the insignia, and a second side block which as viewed in the tire radial direction appears not to overlap the insignia; and an inner end in the tire radial direction of the high protruding portion of the first side block is separated in the tire radial direction from the insignia, and a portion of the high protruding portion of the second side block appears to overlap the insignia as viewed in the tire circumferential direction, wherein the first side block has a low protruding portion, an amount by which the low protruding portion protrudes relative to the reference surface being less than the maximum amount by which the insignia protrudes relative to the reference surface;

the low protruding portion extends toward an interior in the tire radial direction from the high protruding portion of the first side block and is connected to the insignia, the sidewall has an annular projection that extends continuously along a full circumference in the tire circumferential direction; and the plurality of side blocks are arranged toward both the interior and the exterior in the tire radial direction from annular projection.

* * * * *